Patented Oct. 7, 1941

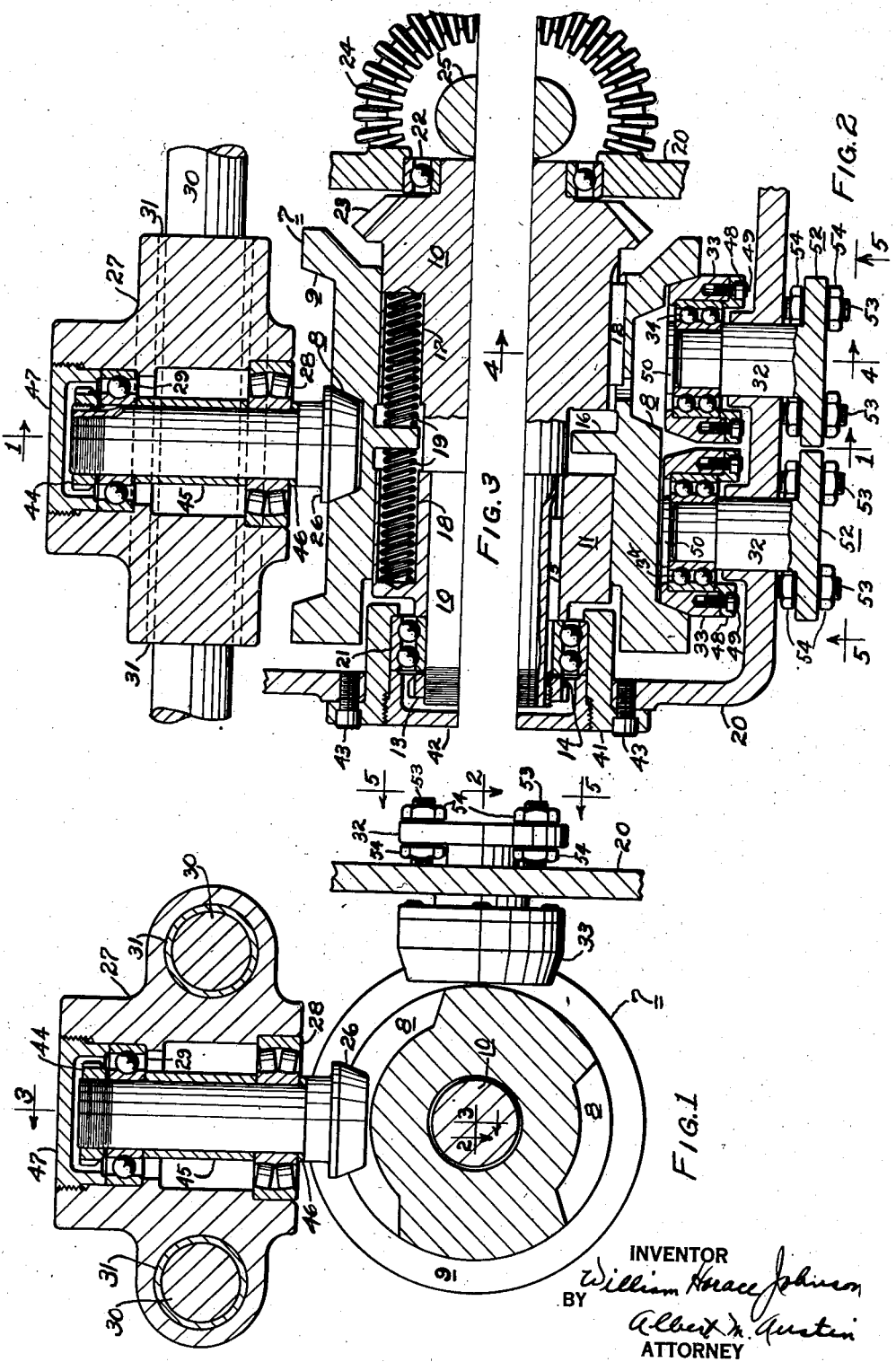

2,258,114

UNITED STATES PATENT OFFICE 2,258,114

CAM FOLLOWER MECHANISM

William Horace Johnson, Edgewood, Cranston, R. I., assignor to Weskenson Corporation, Providence, R. I., a corporation of Rhode Island Application November 15, 1939, Serial No. 304,487

11 Claims. (Cl. 74—57)

The invention relates to mechanical movements and, more particularly, to a cam and follower mechanism. The invention relates to a cam and follower mechanism in which a rotating cam imparts a reciprocating or oscillating motion to a follower and which makes provision for absorbing the forces on the cam necessary for changing the direction of the follower at the ends of its stroke.

According to a preferred form of the invention, the cam is made in the form of a drum mounted for axial movement on a rotating supporting shaft with springs arranged between the supporting shaft and the drum. The exterior cylindrical surface of the cam has a reentrant cam slot extending both axially and circumferentially of the drum and imparting a reciprocatory motion to the follower. A suitable control groove is also provided in which work fixedly mounted control members, the control groove being shaped to hold the cam axially fixed at times and permitting axial movement at other times. For example, the cam may be axially fixed while it is imparting driving motion to the cam follower and it may move axially under the influence of its springs when the follower reaches the ends of its stroke and is executing its return movement.

The invention also consists in certain new and original features of construction and combination of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 is a vertical section through the cam and follower taken on the line 1—1 of Figs. 2 and 3;

Fig. 2 is a horizontal section taken on the line 2—2 of Fig. 1;

Fig. 3 is a vertical section taken on the line 3—3 of Fig. 1;

Figure 6:
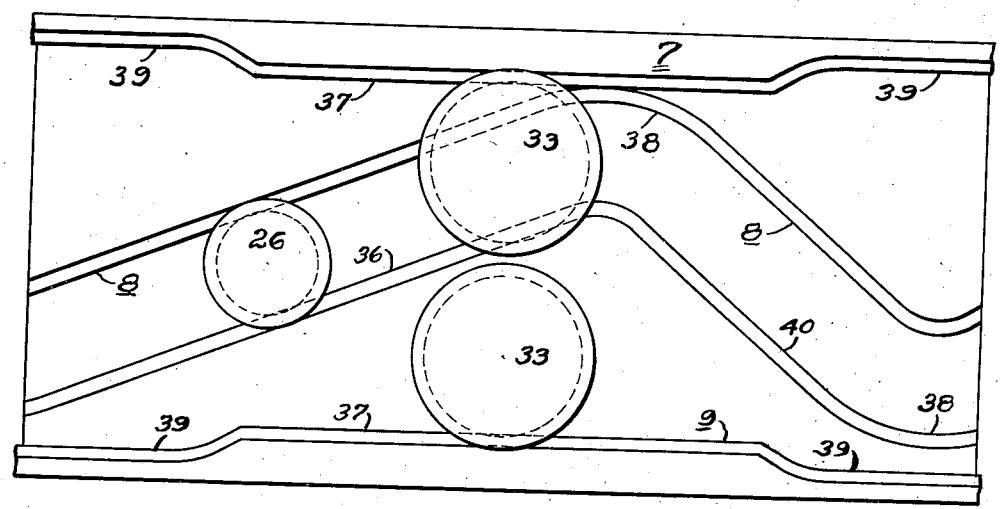
Fig. 6 is a development of the cam tracks showing relationship of the operating track and the control track.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring now to the drawings, the cam drum 7 having an operating track 8 and a control track 9 is slidably mounted on shaft 10 and on collar 11. Shaft 10 has an enlarged end carrying a gear 23 and a smaller end on which is fitted collar 11. Cam drum 7 is featherkeyed to shaft 10 at 12. Collar 11 is securely held on shaft 10 by nut 13 and lock washer 14 and is keyed to shaft 10 by key 15.

In the bore of and constituting a part of cam drum 7 is a ring 16. In shaft 10 is a series of holes 17 and opposite these holes is another series of holes 18 in collar 11. In these holes are compression springs 19 which exert pressure on either side of ring 16 of cam 7. These springs are balanced and are of sufficient strength to hold cam in central position under certain conditions as described more in detail hereinafter.

Shaft 10 is mounted in case 20 on bearings 21 and 22. Shaft 10 is driven through bevel gear 23 by a bevel gear 24 on driving shaft 25. The shafts 10 and 25 can be at any angle, or parallel, and driven by bevel, spur, helical or spiral gears.

For assembling purposes the inner race of bearing 21 is securely held on shaft 10 by nut 13. The outer race is mounted in a sleeve 41 and is held in place by cap 42 and the whole assembly is fitted into case 20 and securely held by screws 43.

Fitted into operating track 8 is a follower 26 which is journalled in slide 27 by bearings 28 and 29. As the cam 7 revolves, follower 26 causes slide 27 to reciprocate laterally on guide rods 30, said slide being fitted with bushings 31 that slide on rods 30.

The bearings 28 and 29 are held securely by their inner races on follower 26 by nut 44 and separated by spacers 45 and 46. Spacer 46 may be changed for spacers of various thicknesses for fitting follower 26 to cam track 8 and to allow for wear of the follower 26. The follower and bearing assembly is held in slide 27 by cap 47.

Adjustably mounted in case 20 are two studs 32 which carry control rollers 33 rotatably mounted thereon in bearings 34. These rollers operate in control track 9, one roller bearing against each side wall of the track.

Figure 4:
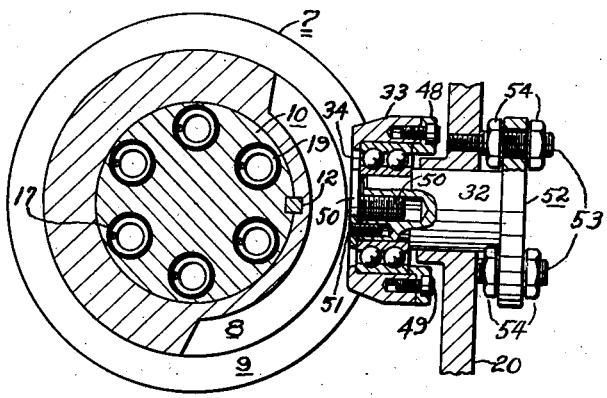
Fig. 4 is a vertical section taken on the line 4—4 of Fig. 2.
Figure 5:
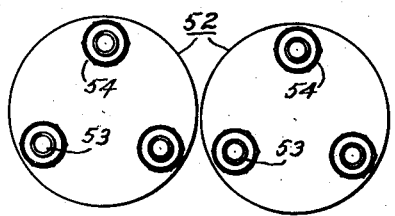
Fig. 5 is a side elevation taken on the line 5—5 of Figs. 1 and 2.

The control rollers 33 are mounted on the outer races of bearings 34 by collars 48 and screws 49. The inner races of bearings 34 are clamped to studs 32 by special large headed screws 50 (Fig. 4) which are locked in place by screws 51. The entire roller and stud assemblies 52 are held in case 20 by studs 53 and they are adjustable for fitting and for entire release by nuts 54.

When the follower 26 is in the forward position 36 of operating track 8, the control rollers 33 are operating in the narrow straight portion 37 of control track 9 and the cam 7 is held longitudinally on shaft 10.

When the follower 26 reaches the decelerating and accelerating portions 38 and the return portion 40 of operating track 8, the control rollers 33 are out of contact with the cam, being in the relieved portion 39 of control track 9. This allows the cam 7 to move longitudinally on shaft 10 under control of the springs 19. Any excessive variations of pressure due to varying speeds are taken up by the springs and the shocks are thus absorbed.

The forward portion 36 of cam track 8 may be used to impart to the follower a power stroke and the return portion 40 may be used to impart to the follower a retrograde or return stroke during which no power is transmitted by the follower, or both portions may be used to impart power strokes to the follower.

The shape of the cam path 8 may vary according to the motion desired. The forward portion 36 of the path 8 may be substantially a true helix and thus, with uniform angular velocity of the cam, impart to the follower a constant linear velocity. Similarly, the return portion 40 of the path may be a substantially true helix. The return portion may be of the same pitch as the forward portion 36 or of a greater pitch, as illustrated, for a quick return motion. Or, the forward portion 36 or the return portion 40, or both, may be so shaped as to impart simple harmonic motions to the follower while it is traversing these portions. The end portions 38 may be shaped to impart, with constant rotation of drum 7, uniformly accelerated and decelerated motion to follower 26.

In the device as illustrated, the parts are so adjusted and the control groove 9 is so shaped as to fix the axial position of the cam drum 7 only during the forward stroke, leaving the springs free to function during the return stroke and at the ends thereof. If desired, the control groove 9 may be so shaped as to fix the axial position of the drum 7 during both forward and return strokes, leaving the springs free to function only at the ends of the strokes.

If desired, the nuts 54 may be adjusted to locate control rollers 33 their farthest point away from the cam track 9 in which event the rollers 33 exert no control action and the shock-absorbing feature is operative during the entire revolution of the cam.

Thus a cam and follower mechanism has been described which will efficiently absorb the shocks due to changing the direction of the follower at the ends of its stroke. At the same time provision is made for providing a positive drive between cam and follower when the cam is executing its driving function. Further, the cam may be rotated in either direction. The mechanism is compact and rugged in construction. The mounting of the cam groove in the floor of the control groove results in saving of space and the antifriction bearings used for the cam follower and control followers and for all vital bearings reduces friction to a minimum. Another advantage of the shock-absorbing cam is the increased smoothness of operation at all speeds of rotation. For example, if the cam groove is laid out for a quiet and smooth operation at a given speed without spring action, at other speeds the operation without the spring action may produce shock at the end of the stroke, but with the spring action, according to the present invention, such shocks will be effectively absorbed.

While certain novel features of the invention have been disclosed and are pointed out in the annexed claims, it will be understood that various omissions, substitutions and changes may be made by those skilled in the art without departing from the spirit of the invention.

What is claimed is:

1. In a cam and follower mechanism, a movable supporting member, a cam member movably mounted on said supporting member, shock absorbing devices between said supporting member and cam member to permit relative movement therebetween, said cam member having a cam path, a follower operating on said path, said cam member also having a control path, control devices on said control path for holding said cam member in fixed axial position at times and permitting said shock absorbing devices to function at times.

2. In a cam and follower mechanism, a rotatable supporting member, a cam drum slidably mounted on said supporting member, shock absorbing devices between said supporting member and cam drum to permit relative movement therebetween, said cam drum having a cam path, a follower operating on said path, said cam drum also having a control path, control devices on said control path for holding said cam drum in fixed axial position at times and permitting said shock absorbing devices to function at times.

3. In a cam and follower mechanism, a rotatable supporting member, a cam member slidably mounted on said supporting member, spring devices between said supporting member and cam member to permit axial movement of said cam member, said cam member having a re-entrant cam track extending both circumferentially and axially of the cam, a cam follower operated by said track, said cam member also having a control track, control devices operating in said control track, means for holding said control devices in fixed operative position, and means for movably mounting said cam follower.

4. In mechanism of the type described, a rotating supporting shaft, a cam drum slidably mounted on said shaft, said drum having a wide annular control groove having tapered side walls, a pair of control members comprising spaced stud shafts, tapered rollers on said stud shafts engaging opposite side walls of said control groove, each roller engaging one wall, a cam groove in the floor of said control groove, said cam groove having tapered side walls, a cam follower comprising a tapered roller disposed in said cam groove, stationary means supporting said control shafts and slidable means supporting said cam follower.

5. In mechanism of the type described, a rotating supporting shaft, a cam drum slidably mounted on said shaft, said drum having an annular control groove, control devices engaging opposite side walls of said control groove, a cam groove in the floor of said control groove, a cam follower disposed in said cam groove, stationary means supporting said control members and slidable means supporting said cam follower.

6. In a cam and follower mechanism, a rotatable supporting member, a cam member slidably mounted on said supporting member, spring devices between said supporting member and cam member to permit axial movement of said cam member, said cam member having a reentrant cam path extending both circumferentially and axially of the cam and having forward and return portions connected by decelerating and accelerating portions, a follower operated by said path to partake of forward and return strokes, said cam member also having a control path, control devices on said control path for holding said cam and supporting member in fixed relative position when said cam follower is traversing the forward portion of the cam path and permitting the springs to function when said cam follower is traversing said return portion and said decelerating and accelerating portions.

7. In a cam and follower mechanism, a shaft mounted for rotation and having spaced cylindrical surfaces, an annular clearance space between said surfaces, a cam drum fitted on said cylindrical surfaces and having an internal ring in said clearance space, a plurality of springs between said shaft and said internal ring, said cam drum having a reentrant external cam groove, said drum also having a control channel having enlargements corresponding to the ends of said operating path and said return path, a follower in said cam groove, and a control follower mounted on a stationary support located in said control channel.

8. In a cam and follower mechanism, a shaft mounted for rotation and having an enlarged portion provided with a cylindrical surface and a reduced end, a collar on said reduced end having a second cylindrical surface coextensive with said first cylindrical surface, said first and second cylindrical surfaces having a clearance space therebetween, a cam drum fitted on said cylindrical surfaces and having an internal ring in said clearance space, said enlargement and collar having seats, a plurality of axially extending helical springs in said seats and bearing against said internal ring, said cam drum having a reentrant external cam groove, extending circumferentially and axially of said drum, said drum also having a control channel laid out on a diameter larger than the diameter of said cam groove, said control channel having enlargements corresponding to the extreme axial portions of said cam groove, a follower in said cam groove, a stationary support, a holder for said follower slidably mounted on said support, and control rollers mounted on said support engaging the sides of said control channel.

9. In a cam and follower mechanism, a rotatable supporting member, a cam drum slidably mounted on said supporting member for axial movement thereon, said cam drum having a reentrant cam path extending both circumferentially and axially of the cam, a follower operating on said cam path, a stationary support having a straight guide on which said follower moves, and shock absorbing devices between said supporting member and said cam drum to absorb shocks due to said follower changing direction at the ends of its path.

10. In a cam and follower mechanism, a rotatable supporting member, a cam drum slidably mounted on said supporting member for relative axial movement, said cam drum having a cam track extending both axially and circumferentially, a cam follower riding on said track, a stationary straight guide member upon which said cam follower moves, said cam drum also having a control track, and relatively stationary control devices riding on said control track for determining the axial position of said cam drum at certain parts of the rotative cycle of the cam drum while permitting relative axial movement of said cam drum and supporting member at other parts of the rotative cycle of the cam.

11. In a cam and follower mechanism, a movable supporting member, a cam mounted on said supporting member for relative movement thereon, said cam having a cam track, a cam follower riding on said track, a stationary supporting member upon which said cam follower moves, said cam also having a control track, relatively stationary control devices riding on said control track for determining the position of said cam at certain parts of the cam cycle while permitting relative movement of said cam at other parts of the cam cycle.

WILLIAM HORACE JOHNSON.